United States Patent [19]

Iwasawa

[11] 4,120,009

[45] Oct. 10, 1978

[54] TAPE RECORDER APPARATUS

[75] Inventor: Teruo Iwasawa, Hachioji, Japan

[73] Assignee: Olympus Optical Company Ltd., Tokyo, Japan

[21] Appl. No.: 806,169

[22] Filed: Jun. 13, 1977

[30] Foreign Application Priority Data

Jun. 25, 1976 [JP] Japan .................................. 51-83695

[51] Int. Cl.² ............................................. G11B 31/00
[52] U.S. Cl. ...................................... 360/71; 360/137; 179/100.1 VC
[58] Field of Search ................................ 360/71, 137; 179/100.11, 100.1 VC

[56] References Cited
U.S. PATENT DOCUMENTS 4,000,517 12/1976 Brickerd, Jr. ......... 179/100.1 VC X
4,041,250 8/1977 Sato ................................. 360/137 X

*Primary Examiner*—John H. Wolff
*Attorney, Agent, or Firm*—Lerner, David, Littenberg & Samuel

[57] ABSTRACT

A tape recorder apparatus comprises a tape recorder internally housing a power source and a pause switch for controlling a drive system, and an adaptor including connecting elements for coupling with the tape recorder without the use of an electrical cord, and a switch for controlling the operation of the tape recorder. The aforesaid switch and a pause switch are connected in parallel with each other across the power source. When the adaptor is connected with the tape recorder, the pause switch is turned off, whereby only the drive system of the tape recorder is controlled by the first mentioned switch.

10 Claims, 8 Drawing Figures

TAPE RECORDER APPARATUS

BACKGROUND OF THE INVENTION

The invention relates to a tape recorder apparatus including a tape recorder and an adaptor which contains switch means for controlling the operation of the recorder.

An adaptor having switch means which controls the operation of tape recorder is known in the form of a voice-operated starter which automatically controls the operation of the tape recorder in response to a voice input to a microphone. In a conventional arrangement, a voice-operated starter operates in response to a voice input to a recording microphone provided on the part of the tape recorder for operating a switching circuit in the power supply circuit, thereby connecting the power supply with the electrical provided. In addition, a monitoring operation in an automatic manner. This permits an efficient use of the power source and avoids waste of the power since the connection of the electrical circuit of the recorder with the power source is automatically controlled in response to the presence or absence of a voice input to the microphone. However, in the conventional arrangement, the entire circuit of the recorder has been turned on or off in response to the voice input, and this made it impossible for a microphone, which is internally housed within the tape recorder, to be used to provide a voice input to the starter unless it is externally fed. This is because the microphone is not supplied with its operating voltage as a result of the electrical circuit of the recorder being maintained off before the voice input is applied. Consequently, in order to permit the internally housed microphone to be used to provide a voice input to the starter, the recorder must be provided with a special terminal for external connection of the microphone with a source of operating voltage. This is often the case in an arrangement of the type in which an output signal from the starter is externally supplied to the tape recorder.

Another problem with the prior art arrangement is found when it is desired to release the control by the starter while the starter remains connected with the tape recorder. In this instance, a separate change-over switch must be separately. In addition, a monitoring operation cannot be performed when the voice-operated starter remains connected with the tape recorder during the time the starter is rendered off.

SUMMARY OF THE INVENTION

It is an object of the invention to provide a novel tape recorder apparatus comprising a tape recorder internally housing a power source and a pause switch for controlling a drive system, and an adaptor including means for connection with the tape recorder without the need for an electrical cord and switch means for controlling the operation of the tape recorder, the switch means and the pause switch being connected in parallel with each other across the power source so that with the adaptor connected with the tape recorder, the pause switch may be turned off to permit only the drive system of the recorder to be controlled by the switch means.

In the apparatus of the invention, a circuit within the tape recorder which relates to the voice signal assumes a condition which is independent from the switch means of the adaptor, so that only the drive system can be controlled by the switch means while maintaining the microphone internally housed within the tape recorder connected with the power source of the tape recorder. Thus, where the adaptor incorporates a voice-operated starter, the tape recorder can be voice-started by utilizing the internal power source and the internally housed microphone of the tape recorder without requiring an external power supply to the microphone. In addition, a monitoring operation is also facilitated. The arrangement does not require the provision of a separate change-over switch, and a mere closure of the pause switch enables the tape recorder to be released from the control by the voice-operated starter.

DESCRIPTION OF PREFERRED EMBODIMENTS

The invention will now be described with reference to an arrangement in which a miniature cassette tape recorder, employing a micro-cassette, is started by a voice-operated starter which is detachably coupled with the recorder and which is driven through a recording microphone internally housed within the tape recorder.

Figure 1:
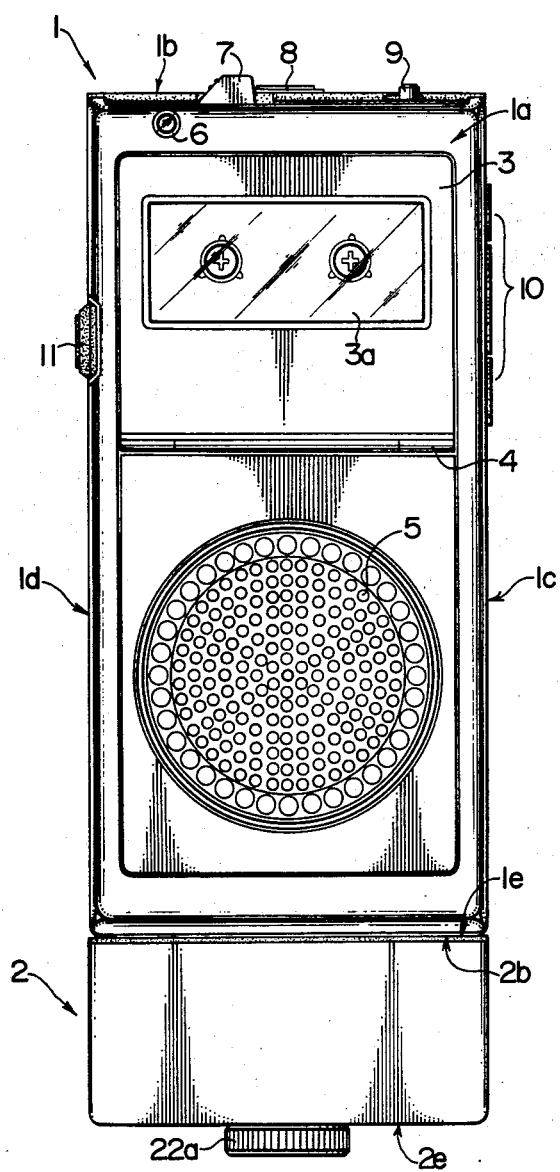
FIG. 1 is a plan view of a miniature cassette tape recorder combined with a voice-operated starter to which the invention is applied.
Figure 2:
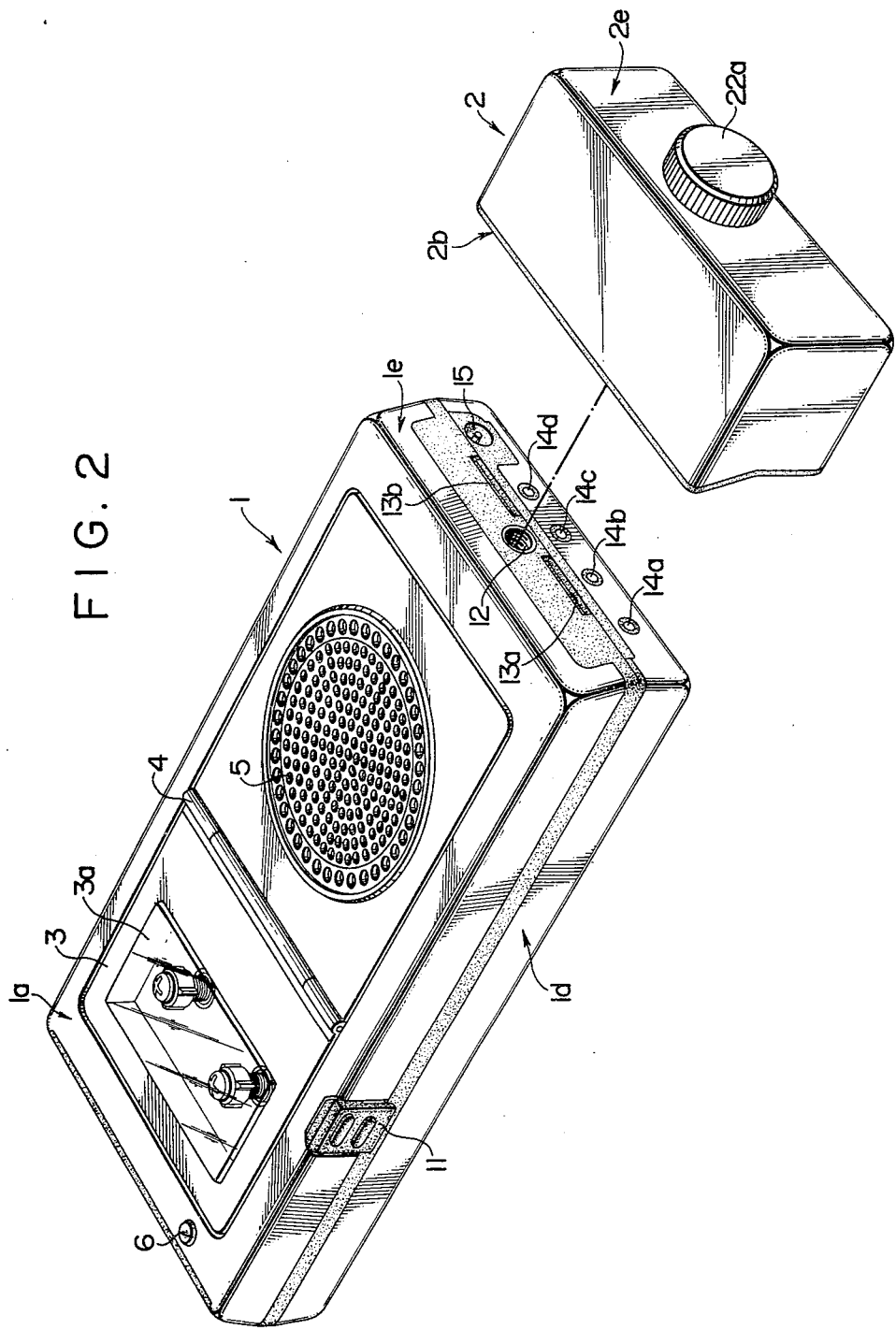
FIG. 2 is a perspective view of the combination of the tape recorder and the starter shown in FIG. 1, which are shown separated from each other.

Referring to FIGS. 1 and 2, there is shown a miniature cassette tape recorder 1 having a top surface 1a, in which an opening is formed in alignment with a cassette receiving chamber. A cover 3 having a sight window 3a is hinged at 4 to the top surface. A grille 5 for an internally housed loudspeaker is also formed in the top surface below the hinge 4, as viewed in FIG. 1. The recorder 1 includes a front surface 1b in which a rapid tape advance/rewind button 7, an opening 8 for an internally housed microphone and a pause button 9 are disposed. A group of operating buttons 10 which are used to establish a record, a playback and stop mode of the tape recorder are mounted in the right-hand side 1c while an eject button 11 for ejecting a loaded cassette tape when the cover 3 is opened is mounted in the left-hand side 1d. An indicator element 6 is disposed adjacent to the cover 3 for indicating that a record mode is established and that a battery is operative.

The rear surface 1e of the tape recorder represents a mating surface for connection with a voice-operated starter 2. The coupling surface 1e is formed with a threaded bore 12 (see FIG. 2) which is engaged by a coupling screw 22 (see FIG. 3) provided on the part of the starter 2. The coupling surface is also formed with a pair of positioning grooves 13a, 13b, and is also provided with a plurality of electrical terminals 14a to 14d as well as a jack 15 for connection with an AC adaptor.

Figure 3:
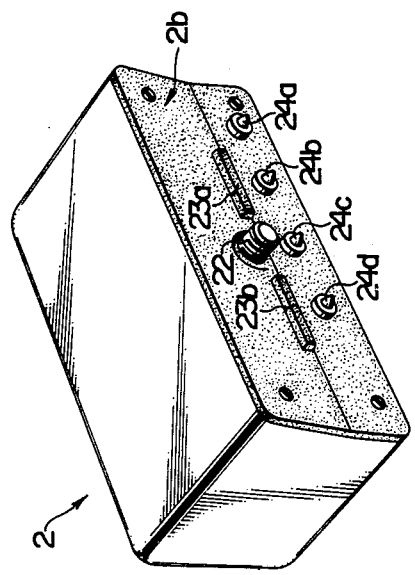
FIG. 3 is a perspective view of the starter shown in FIGS. 1 and 2, as viewed from a different direction.

The starter 2 is adapted to be detachably coupled with the recorder 1, and its general appearance is shown in FIG. 3. Specifically, it includes a mating surface 2b for mating engagement with the surface 1e of the recorder 1, and the coupling screw 22 projects outwardly from a central portion thereof. A pair of positioning ribs 23a, 23b for respective engagement with the grooves 13a, 13b, are provided on the opposite sides of the screw 22. In addition, a plurality of male terminals 24a to 24d are disposed below these ribs for engagement with the corresponding female terminals 14a to 14d. The coupling screw 22 extends through the casing of the starter 2 and is rotatable therein. The screw includes a head 22a (see FIGS. 1 and 2) which projects out of the rear surface 2e of the casing. The screw 22 represents a ground terminal for the electrical circuit within the starter 2, and the electrical circuits of both the recorder 1 and the starter 2 are connected to the ground, represented by the casing, by the screw 22 when the starter 2 is coupled with the recorder 1.

Figure 4:
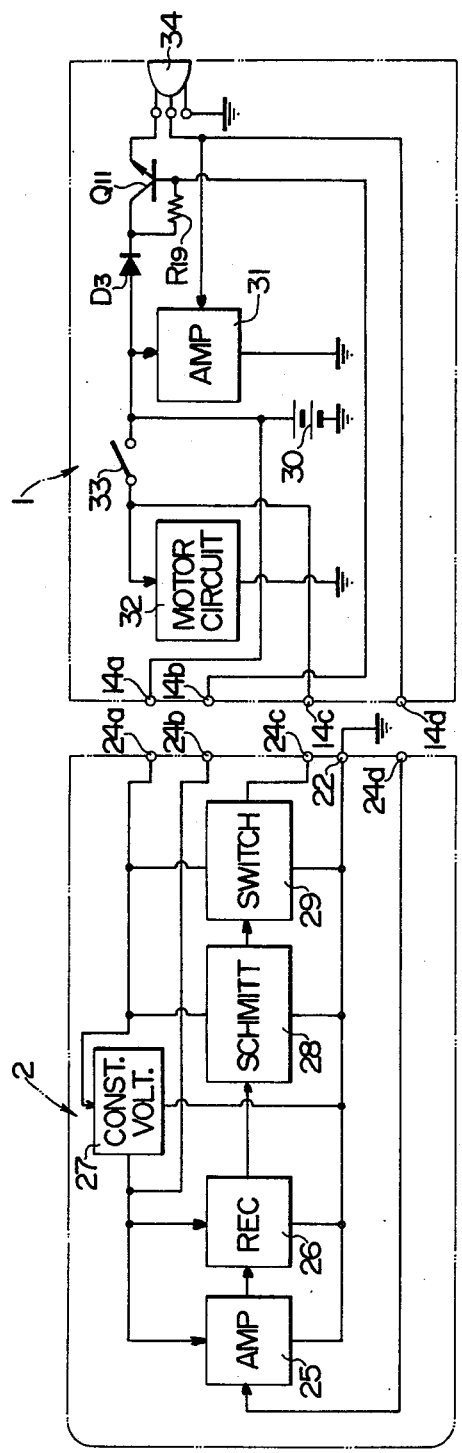
FIG. 4 is a circuit diagram of a voice-operated starter for a tape recorder constructed in accordance with one embodiment of the invention.
Figure 5:
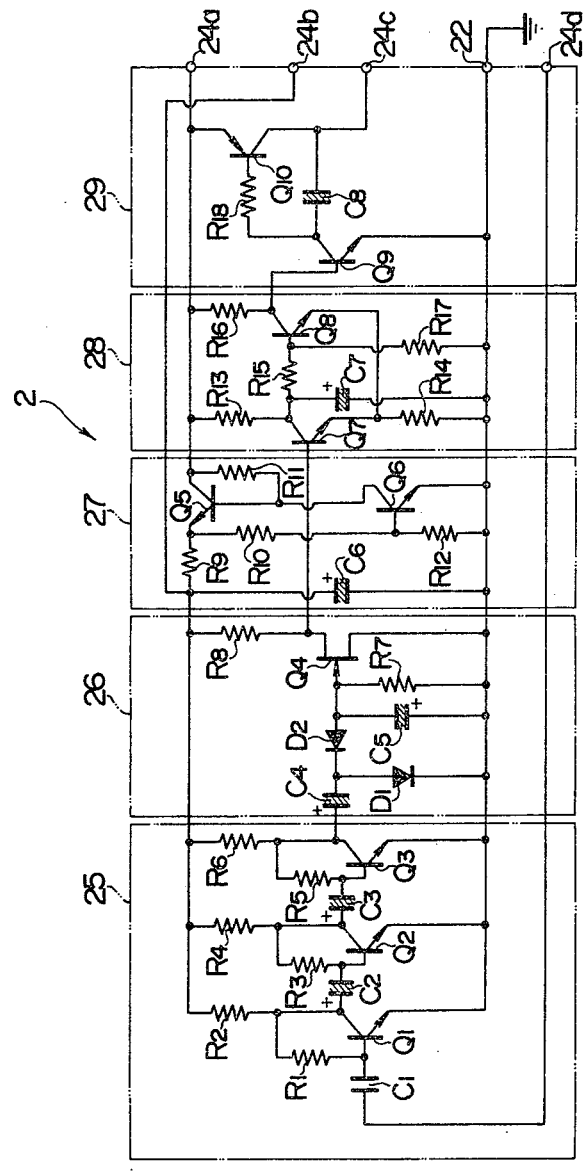
FIG. 5 is a circuit diagram of a specific circuit contained in the voice-operated starter.

FIGS. 4 and 5 show the electrical circuit of the starter 2. As shown, the electrical circuit includes an amplifier circuit 25, a rectifier circuit 26, a constant voltage circuit 27, a Schmitt circuit 28 and a transistor switching circuit 29. Referring to FIG. 5, the amplifier circuit 25 is formed as a three stage amplifier comprising transistors Q1, Q2, Q3, capacitors C1, C2, C3 and resistors R1, R2, R3, R4, R5, R6. The terminal 24d described above is connected with the input of the amplifier, which amplifies an output from the microphone before applying it to the following rectifier circuit 26. The rectifier 26 comprises a field effect transistor (FET) Q4, capacitors C4, C5, resistors R7, R8 and diodes D1, D2, and operates to rectify the output from the amplifier 25 before applying it to the Schmitt circuit 28.

The constant voltage circuit 27 is formed by transistors Q5, Q6, capacitor C6 and resistors R9, R10, R11, R12. The function of the circuit 27 is to stabilize a voltage supplied from the power source within the tape recorder 1 when it is connected with the voice-operated starter, and to supply the stabilized voltage to the circuits 25, 26 through a decoupling circuit formed by resistor R9 and capacitor C6. The Schmitt circuit 28 is formed by transistors Q7, Q8, capacitor C7 and resistors R13, R14, R15, R16, R17, and is responsive to an output from the rectifier 26 for determining a switching level of the following switching circuit 29.

The switching circuit 29 comprises transistors Q9, Q10, capacitor C8 and resistor R18. When the switching circuit 29 is triggered by an output from the Schmidt circuit 28, the transistor Q10 is rendered conductive, whereby the power source terminal 24a is connected through the emitter-collector path of this transistor to the terminal 24c, which is connected with the electrical circuit within the tape recorder 1. The resistor R18 and capacitor C8 form a charging circuit which functions to gradually turn the transistor Q10 off when the switching circuit 29 is turned off. It is to be noted that the recovery time of the voice-operated starter is determined by the values of the capacitor C5 and resistor R7 to thereby provide a suitable delay interval between termination of a voice signal and turn-off of transistor Q10.

The terminal 24b is connected with the junction between the capacitor C6 and resistor R9 of the constant voltage circuit for supplying a supply voltage to a switching transistor Q11 (see FIG. 4) through the terminals 24b, 14b (see FIG. 4) in order to apply an operating voltage to the microphone internally housed within the tape recorder 1 when the starter 2 is coupled with the recorder 1.

FIG. 4 also shows the electrical circuit of the tape recorder 1 in schematic form. It is to be noted that the arrangement is such that the amplifier circuit within the recorder is normally connected with the power source while the connection of the motor circuit of the tape recorder with the power source is controlled by the voice-operated starter 2, in view of the fact that the voltage applied to the amplifier circuit has a slow rise time while the voltage applied to the motor circuit, which includes a tape drive motor, has a rapid rise time.

Referring to FIG. 4, there is shown an internally housed power source 30 in the form of a battery. The source 30 is connected with the terminal 14a and an amplifier circuit 31. A motor circuit 32 is connected through a pause switch 33 with the power source 30. The pause switch 33 remains open when automatic control of the tape recorder 1 by the starter 2 is desired. Thus, in a voice-operated mode, the motor circuit 32 is fed through the switching circuit 29 within the starter 2 and through the interconnected terminals 24c, 14c. The source 30 is also connected through a forwardly poled diode D3 to an operating circuit of an internally housed microphone 34. The operating circuit comprises a switching transistor Q11 and resistor R19. Specifically, the source voltage is applied to the collector of the transistor Q11 through the diode D3. The arrangement is such that when a voltage of a given level is applied to the base of the transistor Q11, it is rendered conductive to apply an operating voltage to the microphone 34. In one embodiment, the microphone 34 comprises a high performance electret condenser microphone and has its output terminal connected in common with the terminal 14d and the amplifier 31. It is to be noted that normally, that is, in the mode other than the voice-operated mode, the microphone 34 is fed from a microphone voltage supply terminal, not shown, within the recorder 1.

When the mating surface 2b of the starter 2 is brought in opposing relationship with the rear surface 1e of the recorder 1, and the ribs 23a, 23b fitted into the positioning grooves 13a, 13b, the starter 2 can be coupled with the recorder 1 as shown in FIG. 1, by turning the coupling screw 22 which threadably engages the bore 12. Thereupon the terminals 24a to 24d on the starter 2 are connected with the terminals 14a to 14d on the tape recorder, whereby the electrical circuit of the starter 2 is connected with the electrical circuit of the recorder 1. Under this condition, the pause switch 33 is left open, and a record mode of the tape recorder is established. The power source 30 contained within the recorder 1 is connected with the electrical circuit of the voice-operated starter, which is therefore ready to operate. In addition, the output terminal of the microphone 34 is connected with the input of the amplifier circuit 25 within the starter through the terminals 14d, 24d, and the output terminal of the transistor switching circuit 29 within the starter is connected with the motor circuit 32 in the tape recorder 1 through the terminals 24c, 14c. Finally, the connection completed between the terminals 24b, 14b applies an output voltage from the constant voltage circuit 27 in the starter to the base of the switching transistor Q11 in the microphone operating circuit of the recorder 1. Thereupon, this transistor is rendered conductive, whereby the source voltage is applied to the microphone 34 to make it operative. Thus, the tape recorder is maintained in a condition in which its amplifier circuit is operative, while only the motor circuit 32 is controlled by the voice-operated starter 2.

When the microphone 34 receives a voice input under this condition, its output is applied to the input of the amplifier circuit of the starter which operates to render the transistor Q10 in the switching circuit 29 conductive. Upon conduction of the transistor Q10, a path including terminals 14a, 24a, transistor Q10 and terminals 24c, 14c is closed to apply the source voltage to the motor circuit 32 of the recorder 1, so that the motor circuit 32 operates to drive its motor for feeding a magnetic tape contained in the tape cassette. Since the described operation occurs in a moment, the motor is driven substantially at the same time as the application of a voice input to the microphone 34, thus avoiding a time lag in the operation of the motor.

Figure 6:
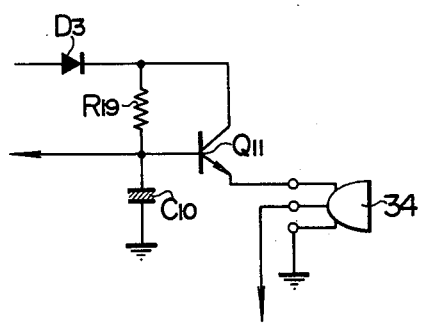
FIG. 6 is a circuit diagram of a microphone operating circuit of the apparatus of the invention in which a capacitor is incorporated.

As shown in FIG. 6, a capacitor C10 may be connected between the base of the circuit transistor Q11 and the ground to form a filter circuit, which eliminates any ripple noise from the motor.

Figure 7:
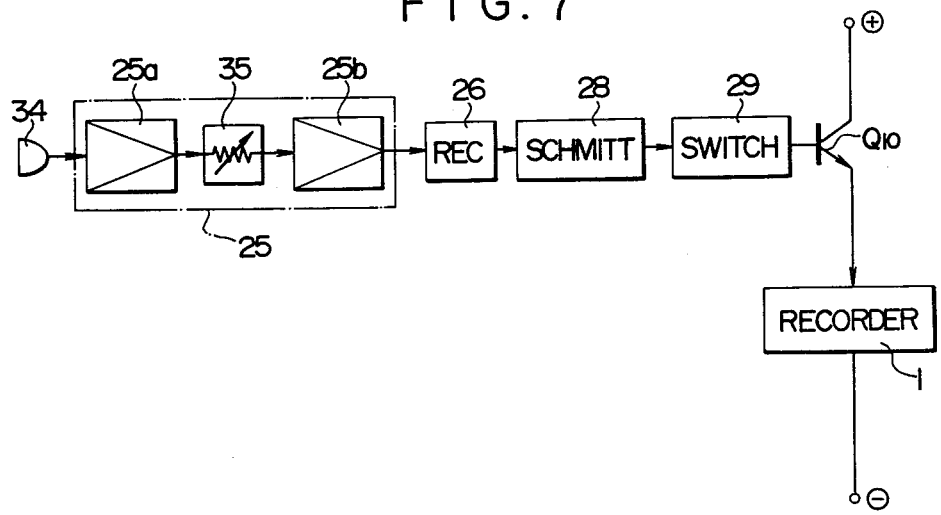
FIGS. 7 and 8 are schematic views showing an acoustic level controller assembled into the amplifier circuit of the voice-operated starter in the arrangement of the invention.

In the described arrangement, the level to which the voice-operated starter operates may be adjusted at an optimum level in accordance with the surrounding, acoustic environment when recording. Referring to FIG. 7, the amplifier circuit 25 comprises a first stage 25a to which a voice input signal from the microphone 34 is applied, a level controller 35 and a second stage 25b. In other respects, the arrangement is similar to that described above. In the embodiment shown, the level controller 35 is formed by a variable resistor so as to be able to change an input level to the second stage 25b in a continuous manner. Thus, the controller 35 can be adjusted in accordance with the surrounding acoustic environment so as to establish an optimum level at which the voice-operated starter operates. Specifically, in a quiet environment where a sound of a very low level can be recorded, the controller 3 is adjusted to establish a low operating level. On the other hand, in a noisy environment, the controller 35 may be used to establish a high operating level.

Figure 8:
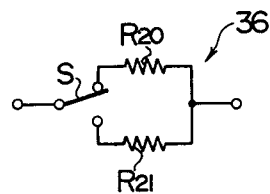

FIG. 8 shows another form of the controller 35, which comprises a pair of fixed resistors R20, R21 having different resistances and which are selectively connected in circuit by a change-over switch S. In this manner, a high and a low level can be established.

What is claimed is:

1. A tape recorder apparatus comprising a tape recorder internally housing a power source, a tape drive system and a pause switch for selectively controlling energization of the drive system, and an adaptor including means for releaseable electrical connection with the tape recorder without the use of an electrical cord and automatic switch means for controlling the operation of the tape recorder, said switch means and said pause switch being connected in parallel with each other between the power source and the tape drive system, whereby when the adaptor is connected with the tape recorder, the pause switch may be moved to an off position to permit the drive system of the tape recorder to be controlled by the automatic switch means.

2. A tape recorder apparatus according to claim 1 in which the switch means is mounted within the adaptor and comprises a voice-operated starter for selectively energizing the tape recorder drive system.

3. A tape recorder apparatus according to claim 2 in which the voice-operated starter comprises an amplifier circuit for amplifying an output signal of a microphone as a voice input is applied to the latter, a rectifier circuit for rectifying an output from the amplifier circuit, a switching level detector circuit responsive to an output signal from the rectifier circuit for providing a trigger signal when the output signal is at a given level, and said switch means which includes a switching circuit including a switching transistor responsive to the trigger signal by becoming conductive to energize a motor circuit of the tape recorder.

4. A tape recorder apparatus according to claim 2 in which the voice-operated starter comprises a threshold level controller for adjusting the level at which the starter operates.

5. A tape recorder apparatus according to claim 4 in which the level controller comprises an adjustable resistor means.

6. A tape recorder apparatus according to claim 4 in which the level controller comprises a plurality of fixed resistors, and a switch for selectively connecting one of the fixed resistors in circuit with the level controller.

7. A tape recorder apparatus according to claim 2 further including a slow switching circuit which comprises a switching transistor for connecting the tape recorder with the power source, and a capacitor connected in circuit with the switching transistor in a manner such that the capacitor is charged as the switching transistor is turned off, thereby allowing the switching transistor to be turned off gradually to provide a delay interval between termination of a voice signal and turn-off of the switching transistor.

8. A tape recorder apparatus according to claim 1 in which the tape recorder further includes a microphone, and a switching transistor connected in circuit with the microphone, the microphone being fed with an operating voltage when the switching transistor is in a first operating condition, the adaptor feeding a voltage to the transistor when it is connected with the tape recorder.

9. The recorder apparatus of claim 1 wherein the adapter further includes means for maintaining a constant voltage level; means for connecting with the power source in the recorder with the constant voltage means and for connecting the constant voltage means when the adapter is joined to the recorder microphone with the recorder.

10. The recorder apparatus of claim 1 further comprising filter means coupled between the motor circuit and the microphone of the recorder to prevent ripple noise which may be developed in the motor circuit from reaching the microphone.

* * * * *